United States Patent [19]

Neeff et al.

[11] Patent Number: 5,045,020

[45] Date of Patent: Sep. 3, 1991

[54] SHIRRED PACKAGING TUBE

[75] Inventors: Rainer Neeff; Richard Lenhart; Helmut Sattler, all of Weisbaden, Fed. Rep. of Germany

[73] Assignee: Hoechst Aktiengesellschaft, Frankfurt am Main, Fed. Rep. of Germany

[21] Appl. No.: 421,158

[22] Filed: Oct. 13, 1989

[30] Foreign Application Priority Data

Oct. 22, 1988 [DE] Fed. Rep. of Germany ... 8813273[U]

[51] Int. Cl.⁵ .............................................. F16L 11/08
[52] U.S. Cl. .................................. 452/21; 138/118.1; 206/802; 426/138; 452/22
[58] Field of Search ....................... 17/49, 33, 1 R; 138/118.1, 109; 206/802; 426/138, 140, 277; 452/21, 22

[56] References Cited

U.S. PATENT DOCUMENTS

| | | | |
|---|---|---|---|
| 4,007,761 | 2/1977 | Beckman | 138/118.1 |
| 4,033,382 | 7/1977 | Eichin | 17/1 R |
| 4,132,047 | 1/1979 | Gerigk et al. | 138/118.1 |
| 4,263,942 | 4/1981 | Lenhart et al. | 138/109 |
| 4,422,215 | 12/1983 | Liekens et al. | 17/1 R |
| 4,467,499 | 8/1984 | Beckman et al. | 17/49 |

FOREIGN PATENT DOCUMENTS 0027592 10/1979 Fed. Rep. of Germany.

Primary Examiner—Willis Little
Attorney, Agent, or Firm—Foley & Lardner

[57] ABSTRACT

An article is disclosed comprising a cylindrical hollow rod, composed of a shirred packaging tube, with an internal bore having a circular cross-section and ending in cavity openings at the two end faces of the hollow rod, in combination with a sheathing which surrounds the hollow rod, leaving the cavity openings free, and an annular body at one of the two cavity openings. The annular body comprises an annular disk, whose inner side face bears directly against the adjoining end face of the hollow rod. The outer side face of the disk is at least partially surrounded by the sheathing. The internal bore of the disk remains free of the sheathing and contains elements for fixing the disk to a cylindrical filler horn.

12 Claims, 3 Drawing Sheets

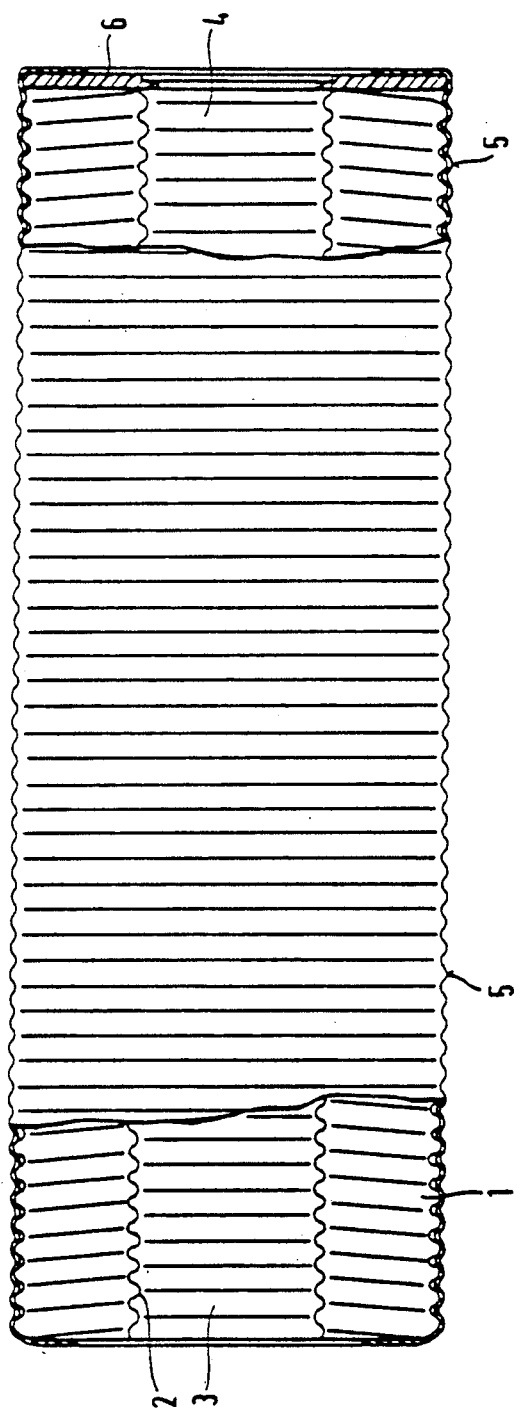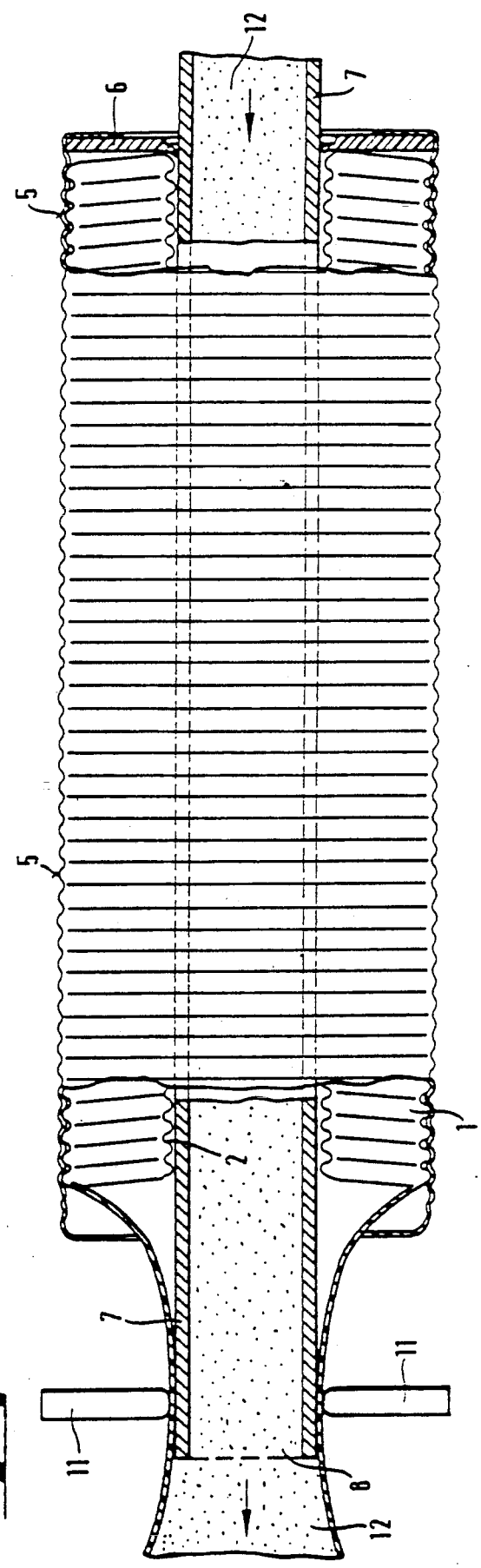

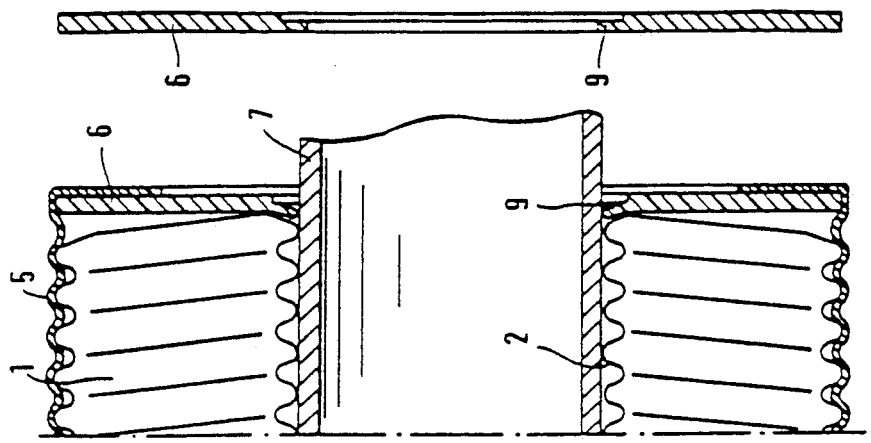
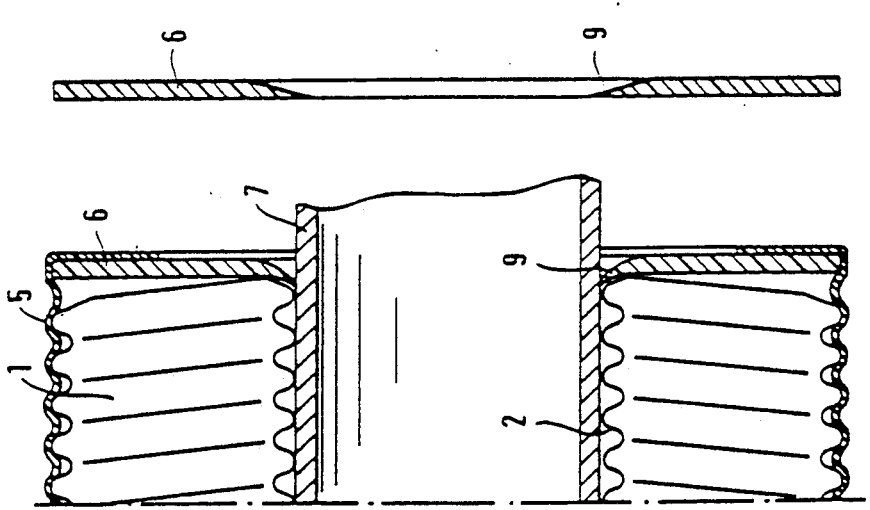
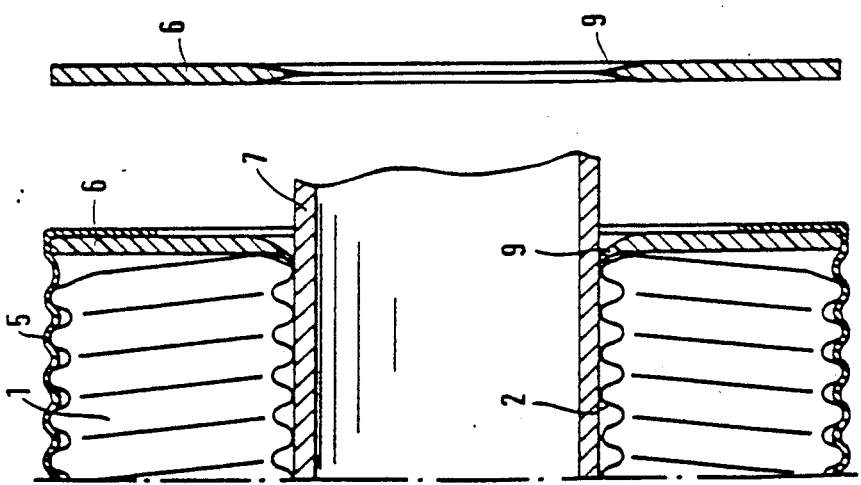

SHIRRED PACKAGING TUBE

BACKGROUND OF THE INVENTION

The invention relates to a cylindrical hollow rod with an internal bore having a circular cross-section and ending in circular cavity openings at the two end faces of the hollow rod, composed of a shirred packaging tube, in particular of a shirred artificial sausage casing, in combination with a sheating which surrounds the hollow rod, leaving the cavity openings free, and an annular body at one of the two cavity openings. Hollow rods of this type, used as sausage casings, are also described as shirred casing sticks and their tubular outer wrapping as a support sheathing.

A combination of shirred tubular casing and support sheathing has been described, for example, in U.S. Pat. No. 4,263,942. In this arrangement, both cavity openings at the end faces of the hollow rod are deliberately left free, so that the filler horn can be introduced into the internal bore of the hollow rod without the outer sheathing having to be removed first. This arrangement has the disadvantage, however, that the outer support sheathing and the shirred casing stick arranged therein are not fixed to the filler horn during the filling step. When the packaging tube is drawn off the filler horn by the sausage meat forced in during the filling step and is thus unshirred, there is a risk of the unfixed support sheathing being drawn off in the same direction and thus passing into the brake which, as is known, is provided in the vicinity of the filler horn opening and is intended to press the unshirred packaging tube onto the filler horn and thus to delay the drawing off of the packaging tube.

This disadvantage is intended to be eliminated in EP-B-0,027,592 (FIG. 1) by means of a rubber ring, around which a net-like support sheathing is looped. During the filling step, the support sheathing is opened at the opposite end, whereby the tension of the rubber ring is loosened. The rubber ring then lays itself around the filler horn and is intended to hold the support sheathing firmly on the filler horn in this way. However, particularly firm fixing of the support sheathing is not achieved by the rubber ring so that, even in this embodiment, there is a risk of the net-like support sheathing being drawn into the casing brake.

The arrangement of U.S. Pat. No. 4,422,215 (FIG. 2) likewise allows fixing of a net-like support sheathing to the filler horn. According to this state of the art, one of the two cavity openings of the hollow rod is narrowed by the sheathing in a circular surface, so that the passage opening at this end face of the hollow rod has a radius which is smaller than the radius of the internal bore of the hollow rod. This narrowing of the cavity opening is effected by a flexible ring which is held in its position by a folded-back section of the sheathing. This ring comprises an annular, radially outward-extending flange part, which bears against the end face of the shirred casing stick and an annular sheathing section with several holding fingers which press the sheathing against the filler horn (FIG. 4 of U.S. Pat. No. 4,422,215).

It is also known, however, that the cross-section of the internal bore of shirred packaging tubes should always be as small as possible, because more space is then available for the folds of the packaging tube and a particularly large ratio of unshirred tube length to the length of the hollow rod is obtained. When the tubular casing is shirred, a shirring mandrel is therefore used, the diameter of which is as small as possible and approximately corresponds to the diameter of the filler horn, so that the shirred tube with its internal bore corresponding to the diameter of the shirring mandrel can still just be pushed onto the filler horn. If a ring, corresponding to U.S. Pat. No. 4,422,215 with an annular rubber section is then inserted into the end of the shirred casing stick, the shirred casing stick must either have a larger internal bore, so that the space required for the sheathing section of the ring is available, or there is a risk of the tube folds in this region being damaged by the sheathing section. Further disadvantages are that the sheathing section can be pushed over the filler horn surface only with difficulty when the shirred stick is applied to the filler horn and, on the other hand, does not provide a particularly firm hold, and in addition the manufacture of this ring, comprising a flange part and a sheathing section, is relatively expensive and requires a lot of material.

SUMMARY OF THE INVENTION

Accordingly, it is an object of the present invention to provide an article comprising a hollow rod, composed of a shirred packaging tube, a sheathing section and an improved annular body which, because of its arrangement and its shape, precludes the risk of damage to the hollow rod.

Another object of the present invention is to provide an article with an annular body which allows simple and firm fixing of the support sheathing on the filler horn, without problems arising due to placement of the hollow rod onto the filler horn.

A further object of the present invention is to provide an annular body which is easy and inexpensive to manufacture.

Yet another object of the present invention is to provide an article which allows no exchange of moisture between the shirred packaging tube and the surroundings.

In accomplishing the foregoing objectives, there has been provided, in accordance with one aspect of the present invention, an article comprising a cylindrical hollow rod which comprises a shirred packaging tube with an internal bore having a circular cross-section and ending in a cavity opening at each of the two end faces of the hollow rod, a sheathing surrounding the hollow rod and leaving the cavity openings free, and an annular disk disposed at one of said cavity openings, wherein the inner side face of the disk bears directly against the adjoining end face of the hollow rod, the outer side face of the disk is at least partially surrounded by the sheathing and the internal bore of the disk remains free of the sheathing and comprises an element for fixing the disk to a cylindrical filler horn.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention is explained in more detail by reference to FIGS. 1 to 7 as well as 3a to 6a, in which:

FIG. 1 shows a sheathed hollow rod in side view, partially in section,

FIG. 2 shows the sheathed hollow rod of FIG. 1 during the filling step,

FIGS. 3, 4, 5 and 6 show an enlarged detail of the internal bore of the disk shown in FIG. 1, with various embodiments of the internal bore, FIGS. 3a, 4a, 5a and 6a show an enlarged detail of the disk shown in FIG. 2, with various embodiments of the internal bore.

DETAILED DESCRIPTION OF THE PREFERRED EMBODIMENTS

Figure 7:
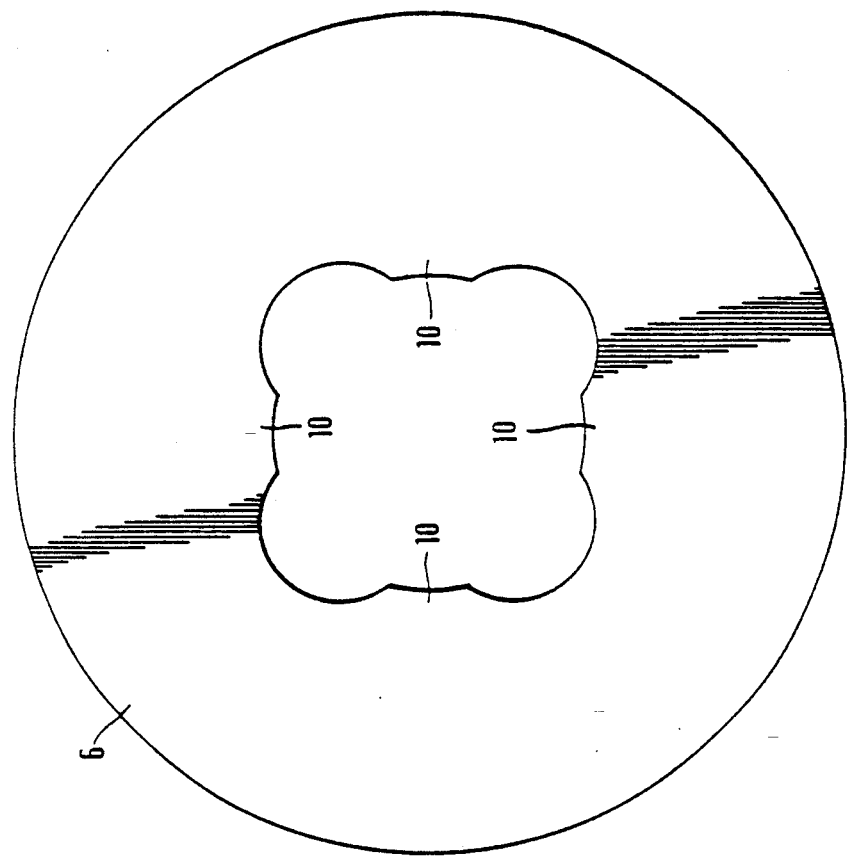
FIG. 7 shows a front view of the disk of FIG. 6.

The invention thus comprises a hollow rod of a shirred packaging tube, which is surrounded by a sheathing, preferably on all sides, i.e., on its circular-cylindrical outer circumference and also on the two end faces. The shirred packaging tube is in particular a shirred artificial sausage casing and is composed, above all, of cellulose or fiber-reinforced cellulose. For filling with sausage meat, this sausage casing is pushed in the shirred state onto the filler horn of a filling machine. As a result of sausage meat being forced in, the sausage casing is drawn off the shirred part and unfolded. As a result of the shirred state, a greater length of tube can be processed into sausages without interruption of the filling process.

The outer sheathing serves as a support sheathing for the shirred packaging tube. It is tubular and is formed, for example, by a web-like film which is wound around the outer circumference of the hollow rod, the overlapping edges being mutually joined, for example by a longitudinal axial weld seam. In the same way, two superposed web-shaped films can be used for wrapping the interposed shirred packaging tube, two longitudinal axial weld seams being formed in a corresponding manner. In general, seamless tubes can also be used as the sheathing. The sheathing is produced in individual discrete lengths or severed from a tube length in individual sections.

On the end faces of the hollow rod, the sheathing is drawn around the last folds of the shirred packaging tube and grips around the annular body. It extends up to the vicinity of the two circular openings of the cavity which are formed by the internal bore of the hollow rod and which are called cavity openings.

The film used as the sheathing is composed, for example, of heat-shrinkable plastic, i.e., a film material which has a latent shrinking capacity of more than 5% and in particular more than 10% in the longitudinal and/or transverse directions, the shrinking being initiated at elevated temperature. After the shirred packaging tube has been sheathed with the heat-shrinkable plastic film, the shrinkage of the film is initiated under the action of heat, for example by means of hot air or a radiant heater. The film lays itself snugly and firmly around the outer circumference of the hollow rod and forces the annular body against the adjoining end face of the hollow rod. On the outer circumference of the hollow rod which, due to the mutually adjoining folds of the shirred packaging tube, has a wavy surface, the shrunk-on sheathing follows this surface structure of the hollow rod, and the shrunk plastic film extends over each individual fold and down into the interspaces between the folds of the shirred packaging tube, so that the individual folds are held firm by the plastic film. The shrunk plastic film usually has a relatively small thickness, so that the fold structure on the outer circumference of the hollow rod remains visible through the plastic film. This close contact between the outer sheathing and the folds of the shirred packaging tube on the outer circumference of the hollow rod has the advantage that, during the filling process, the as yet not unshirred part of the packaging tube is held firm in its position by the outer sheathing and thus cannot be drawn off the tube, which runs off and is unshirred, in the direction of and into the tube brake at the filler horn opening. The as yet not unshirred part of the packaging tube is thus not freely mobile within the sheathing, but its outer circumference is fixed by the sheathing.

A film of elastically deformable material can also be used in place of a film of heat-shrinkable material. It is greatly extended when drawn over the hollow rod and, after the tension has been released, it lays itself closely around the folds of the packaging tube, in the same way as the heat-shrunk film.

In a preferred embodiment, a shirred packaging tube is used, which must be protected from drying out, in particular a cellulose casing, which may be fiber-reinforced and which has an increased moisture content of more than 15% by weight, relative to the total weight of the packaging tube, and therefore has a suppleness and extensibility sufficient for the filling process, without further treatment with water. The support sheathing used for this purpose is a water-impermeable film which is closed, i.e. which has no perforations. Suitable films are composed, for example, of polyvinylidene chloride, polyvinyl chloride, polyolefins such as polyethylene and polypropylene, and polyester. The two cavity openings of the hollow rod are then sealed water-tight, for example by means of caps or covers, in particular by means of self-adhesive, releasable films, which are known as labels with a pressure-sensitive adhesive layer. If, however, the shirred casing is still to be moistened with water, the sheathing used is a net or a film provided with perforations, so that it is easier for the outer circumferential surface of the hollow rod to absorb water.

At the one end of the hollow rod, there is an annular body in the form of an annular disk. Its outer circumference corresponds as a maximum to the outer circumference of the cylindrical hollow rod. The outer circumference is preferably circular, but it can also have a polygonal shape. The width of the outer circumference corresponds approximately to the thickness of the disk. This thickness is comparatively small relative to the disk diameter and is usually 1 mm or smaller, whereas the disk diameter amounts to several centimeters. The internal bore of the disk is advantageously located in a central position and exhibits a cross-section which allows the filler horn of a filling machine to be introduced through the disk into the interior of the hollow rod. However, the internal bore of the disk has a smaller opening width than the circular cross-section of the internal bore of the hollow rod, so that the access to the cavity opening of the hollow rod is narrowed. The width of the internal bore corresponds approximately to the thickness of the disk or is even smaller than the thickness of the disk.

The disk comprises two side faces which extend from the internal bore to the outer circumference, namely a preferably annular outer circumference and an internal bore. The two side faces are preferably flat and extend mutually parallel or approximately parallel and perpendicular or approximately perpendicular to the longitudinal axis of the hollow rod. The two side faces and the outer circumference thus show a U-shaped profile in cross-section in the direction of the longitudinal axis of the hollow rod. It is also possible, however, for the side faces and, if appropriate, also the outer circumference of the disk to have a shape which is bent in this cross-section.

The disk bears closely with its internal side face directly against the adjoining end face of the hollow rod and, in this way, protects the end folds at this end of the hollow rod from stresses due to compression and shocks. The sheathing which surrounds the shirred packaging tube extends around the outer circumference of the disk and then in the direction of the cavity opening of the hollow rod over the outer side face of the disk, the outer side face being partially or completely covered. The disk is held firm due to the covering of the outer side of the disk by the sheathing. It is therefore necessary to size the outer side face of the disk and its covering by the sheathing in an appropriate manner. The free passage through the preferably circular cross-section of the internal bore of the disk is preserved, and the sheathing does not extend into the internal bore.

The side wall of the internal bore of the disk is formed in such a way that the disk is releasably fixed on a cylindrical filler horn, which is pushed through the internal bore of the hollow rod. The internal bore of the disk is thus suitable for coming into frictional or non-positive contact, by its side wall, with the outer circumference of a filler horn, it being possible for the connection between the filler horn and the disk to be made and released again by hand. For this purpose, elements are provided in the side wall of the internal bore of the disk, in particular single elevations such as inward projections, webs or knobs, which extend out of the side wall of the internal bore of the disk in the direction of the cavity opening of the hollow rod. The elevations in the internal bore of the disk reduce the free passage area and together form, in part regions of the internal bore of the disk, an internal circumference which is smaller than the outer circumference of the filler horn. In order to be able at all to push the disk onto the filler horn, these elements in the internal bore of the disk must therefore be sufficiently flexible, so that they can bend over laterally when they are pushed onto the filler horn, in the direction opposite to that of the forward movement on the filler horn.

In a preferred embodiment, for fixing the disk, a side wall with funnel-shaped tapering is provided in the internal bore, the radius or the circumference of the circular internal bore reducing continuously or discontinuously in the direction of the hollow rod and reaching a minimum. It is particularly advantageous if the radius or circumference of the circular internal bore decreases gradually from the outer side face of the disk in the direction of the internal bore of the hollow rod, the radius or circumference reaching the minimum at the internal side face of the disk. Due to the continuously reducing radius in the internal bore of the disk, the disk thickness is reduced, so that the flexibility and bending ability of the disk increases in this region with decreasing radius of the internal bore.

In this embodiment, the internal bore of the disk exhibits a frustoconical side wall, at least in a part region of the side wall, which tapers symmetrically towards the central longitudinal axis of the hollow rod.

When the sheathed hollow rod is pushed onto the filler horn of a filling machine, it is held in such a way that the filler horn is taken first through the internal bore of the disk, so that the disk at the filler horn end, which is opposite to the filler horn opening, is fixed to the outside of the filler horn.

In the region of the smallest radius or circumference of the internal bore of the disk, the internal bore is axially deformed and bent, when the hollow rod is pushed onto the filler horn, in the direction opposite to that of the forward motion, i.e. in the filling direction, and remains in this state. When, on drawing-off of the packaging tube during the filling step, a pulling force in the direction of filling is exerted on the sheathing, the disk, due to the firm seating on the filler horn, prevents the sheathing from also being pulled away in the direction of filling. As a result, there is no risk of the sheathing, in some cases together with the sheathed, not yet unshirred part of the packaging tube, being drawn into the brake located at the filler horn opening.

The disk does not require any special mechanical properties and can be produced from cheap plastic material, for example by punching out and hot-pressing sheet blanks.

Referring now to the drawing, in FIG. 1, the cylindrical hollow rod 1 of shirred packaging tube has an internal bore 2 and cavity openings 3 and 4. It is provided with an outer sheathing 5 which surrounds the outer circumference of the hollow rod and partially the outer side face of an annular disk 6. The internal side face of the disk 6 bears closely and directly against the end face of the hollow rod 1.

In FIG. 2, the disk 6 is fixed by its internal bore to the outer circumferential face of the filler horn 7. In the vicinity of the filler horn opening 8, there is a tube brake 11, which is only diagrammatically shown and which presses the unshirred packaging tube against the filler horn 7 and thus delays the running-off of the tube while the sausage meat 12 is forced in.

Various embodiments of the internal bore of the disk 6 are shown on an enlarged scale in FIGS. 3, 4, 5 and 6. The element for fixing the disk 6 to the filler horn 7 in FIGS. 3, 4 and 5 is an annular elevation 9, the radius of the internal bore decreasing from the outer side face to the inner side face of the disk 6, i.e. in the direction of the internal bore of the hollow rod. The internal bore of the disk 6 forms, in the embodiment of FIGS. 3 and 4, a symmetrical, tapering, frustoconical surface, and the annular elevation in FIG. 5 is in a stepped form.

Figure 6:
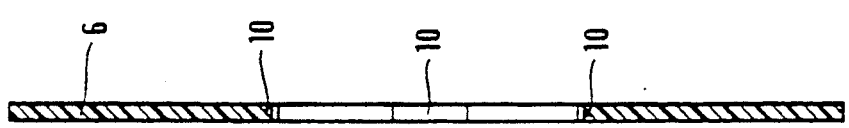
Figure 6A:
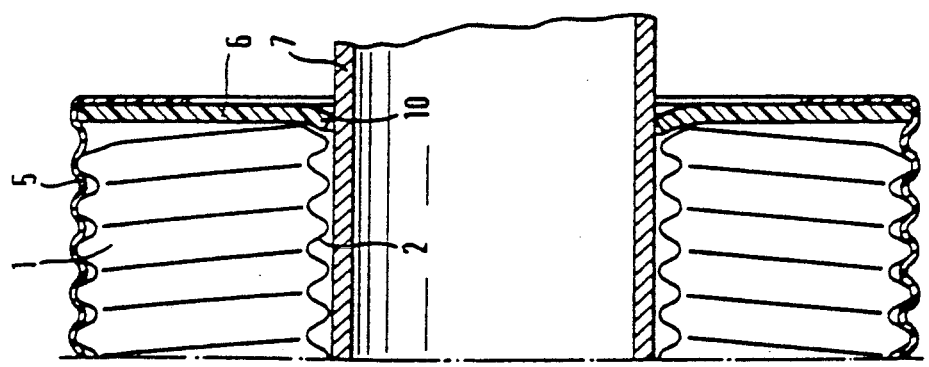

In the embodiment of FIG. 6, the internal bore of the disk 6 has a reduced radius or circumference only in part regions, namely in the region of the individual elements 10 which point towards the central axis of symmetry. This is made clear by the front view in FIG. 7. FIGS. 3a to 6a show the embodiments of the disk, illustrated in FIGS. 3 to 6, in the position shown in FIG. 2. The same reference numerals are used for the same elements.

The sheathed hollow rod of the invention has the advantage that the shirred packaging tube cannot be damaged, as a result of the special arrangement and shaping of the annular body as a disk. The disk 6 can be pushed without problems onto the filler horn 7, when the elements 9 or 10 can readily be bent, and can be fixed firmly to the filler horn. During the filling step, the as yet not unfolded remainder of the hollow rod is held back in the sheathing fixed in its position by the disk, so that the still shirred remainder of the packaging tube cannot be drawn into the brake during the filling step. Moreover, caliber variations during the filling step, in particular when small braking forces act on the packaging tube which has been drawn off, are avoided.

What is claimed is:

1. An article comprising a cylindrical hollow rod which comprises a shirred packaging tube with an internal bore having a circular cross-section and ending in a cavity opening at each of the two end faces of said hollow rod, a shrink-fitted plastic film surrounding said hollow rod and leaving said cavity openings free, and an annular disk disposed at one of said cavity openings, wherein the inner side face of said disk bears directly against the adjoining end face of said hollow rod, the outer side face of said disk is at least partially surrounded by said shrink-fitted plastic film and the internal bore of said disk remains free of said shrink-fitted plastic film and comprises a flexible element for fixing said disk to a cylindrical filler pipe, and wherein said disk precedes said shirred packaging tube when said article is mounted on said filler pipe.

2. An article as claimed in claim 1, wherein said shirred packing tube is a shirred artificial sausage casing.

3. An article as claimed in claim 1, wherein the internal bore of said disk is circular and wherein the radius of said circular internal bore decreases in the direction of the internal bore of said hollow rod.

4. An article as claimed in claim 3, wherein the radius of said circular internal bore decreases conically or in steps.

5. An article as claimed in claim 3, wherein the internal bore of said disk has, at least in a part region of the internal bore, a funnel-shaped side wall which tapers symmetrically in the direction of the central longitudinal axis of said hollow rod, the radius of the circular internal bore of the disk decreasing in the direction of the internal bore of said hollow rod.

6. An article as claimed in claim 3, wherein the internal bore of said disk has a reduced radius only in part regions.

7. An article as claimed in claim 6, wherein the internal bore of said disk has a reduced radius due to a plurality of individual elements distributed over its side wall.

8. An article as claimed in claim 7, wherein said elements are projections, webs or knobs.

9. An article as claimed in claim 1, wherein said hollow rod is surrounded by a shrink-fitted plastic film.

10. An article as claimed in claim 9, wherein said plastic film is moisture-impervious.

11. An article as claimed in claim 1, wherein said shirred packaging tube comprises cellulose which, due to its increased water content, does not have to be subjected to any further treatment with water before filling with sausage meat, said sheathing comprises a water-impervious film and said cavity openings of said hollow rod are sealed water-tight.

12. An article as claimed in claim 1, wherein said cavity openings of said hollow rod are sealed by detachable self-adhesive films.

* * * * *